United States Patent [19]

Brouwer

[11] 4,453,084
[45] Jun. 5, 1984

[54] OPTICAL PATTERN TRACING SYSTEM

[75] Inventor: Frans Brouwer, Glencoe, Ill.

[73] Assignee: ESAB, North America, Inc., Ft. Collins, Colo.

[21] Appl. No.: 302,652

[22] Filed: Sep. 15, 1981

[51] Int. Cl.³ .............................................. G05B 1/00
[52] U.S. Cl. .................................... 250/202; 318/577
[58] Field of Search ....................... 318/577; 250/202

[56] References Cited

U.S. PATENT DOCUMENTS

3,322,952  5/1967  Jewell ............................... 250/202
3,704,372  11/1972  Parker ............................... 250/202

*Primary Examiner*—David C. Nelms
*Assistant Examiner*—J. Brophy
*Attorney, Agent, or Firm*—Dillis V. Allen

[57] ABSTRACT

An optical pattern tracing system of the type having a tracing head with a scanner that projects a photocell onto a pattern in a closed path and provides two signals for each complete path across a line with an approach control for driving the tracing head toward the pattern-line that permits the operator to preselect either clockwise or counterclockwise tracing. The tracing head approach control includes circuitry that selectively blocks the first or the second pulse from the photocell and then terminates the blocking function shortly after the line is reached. An improved line detector is also disclosed that detects the true center of the line to be traced, and a dual pulse detector is also provided that assures that the scanner is fully locked onto the line prior to switching from manual to automatic control.

27 Claims, 14 Drawing Figures

OPTICAL PATTERN TRACING SYSTEM

BACKGROUND OF THE PRESENT INVENTION

In conventional pattern tracing systems of the optical type, a scanner mirror forms part of an optical system which normally projects an image of a photocell onto a line or an edge which is part of the pattern to be traced. When the scanned image of the photocell traverses the pattern, signals are obtained from the photocell which are used to derive directional and displacement signals which in turn are used to derive signals for X and Y coordinate servo-systems that maintain the optical scanning system positioned properly above the pattern while driving it along the pattern at a preselected speed.

The speed signals for the tracing head are generally set to a predetermined value on a control panel, which value when multiplied by the sine and cosine of the angle that the pattern makes with a reference direction form individual coordinate speed signals which are usually directly added to servo-input signals. Sine and cosine signals are derived from the optical scanning information, either with electromechanical synchro-resolvers in the tracing head or with electronic sine/cosine resolving circuits, and these signals are fed to the respective servo-motors to control servo-motor speed along each coordinate so that the tracing head follows the pattern to be traced.

Optical pattern tracers of this type are widely used in the industry to guide machine tools such as flame cutting machines or milling machines along a path identical to that on a flat or two-dimensional pattern. Examples of these systems are illustrated in the Barry et al. U.S. Pat. No. 2,499,178, the Brouwer U.S. Pat. No. 3,017,552, and the Jewel U.S. Pat. No. 3,322,952.

In optical line tracing systems, pattern-line catching has always been a difficult problem and in fact many commercially available tracers have totally unreliable line-pattern catching systems. Still other pattern catching systems known in the prior art are capable of achieving adequate pattern catching only when the pattern is approached at a shallow angle by the tracing head. Frequently the pattern catching systems in known optical pattern tracers either fail to catch the line at all or are uncertain as to the direction of travel following catching. Furthermore, pattern catching systems presently known are incapable of distinguishing direction once the scanner is locked onto a line.

The present invention relates particularly to optical scanners, that project a photocell in a circular or eliptical scan path on the pattern-line. They usually include an electronic resolver that consists of a sine/cosine generator for producing four sine waves mutually shifted in phase by 90 degrees. These sine and cosine waves are each fed to a sample and hold circuit and a pulse train derived from signals from the photocell momentarily opens the sample and hold circuits at a given phase angle and causes capacitors in the sample and hold circuits to be charged to DC values corresponding to the instantaneous value at the given phase angle of the cosine and sine waves from the generator. These DC voltages are fed to X and Y servo-amplifiers on a machine frame for the tracer to drive a compound slide in a direction corresponding to the selected angle of the sine and cosine waves.

In automatic steering systems the phase of the pulses from the photocell controls the opening of the sampling and hold circuits and such a photocell processing system is illustrated in my co-pending U.S. patent application Ser. No. 108,549 filed Dec. 31, 1979, and entitled An Optical Pattern Tracing System, and corresponding International application PCT/U.S. No. 80/01717, filed Dec. 23, 1980, and reference should be made thereto for a complete description of the scanner mechanism and the manner of processing the photocell signals for this purpose.

Some of these prior optical pattern tracing systems include a pattern approach and catching sub-system that enables an operator to select a manual steering direction for approaching the pattern to be followed. One such sub-system includes a mechanical resistive potentiometer that is connected to receive the sine waves produced by the electronic generator. The potentiometer includes a rotatably mounted slider that engages four annularly arrayed arcuate resistors arranged to produce a sine wave in the slider having a phase proportional to the angle of the slider on the potentiometer. The slider sine wave is fed through a high gain amplifier that produces a square wave pulse train used as the directional pulse train for manual steering. The operator thus selects the appropriate approach direction by setting the angular position of the potentiometer slider. These resistive type manual resolvers are very expensive and add significantly to the cost of the overall tracing system. Moreover, the metal-to-metal contact in these potentiometers creats wear, which after a relatively short time, requires replacement of the entire potentiometer.

After the pattern-line is approached in a predetermined direction by the tracing head, as set by the manual resolver, the control of the steering function must be switched from the manual mode to the automatic mode. A variety of prior line detection circuits produce signals which operate an electronic switch so that the manual directional pulse train is replaced by a similar signal from the photocell circuit.

In these prior tracing systems, the direction that the tracing head follows the pattern after catching is fixed and cannot be preselected by the operator of the machine. When the tracing head or scanner is properly over the line, the photocell provides two signals for each complete scan circle. In most tracing systems it is the leading pulse produced by line crossings in the direction of motion that is the one used for control, although some tracers such as the one disclosed in my co-pending application PCT/U.S. No. 80/01717, filed Dec. 23, 1980, may utilize the trailing pulse for control. It is this leading pulse control that compels prior tracing systems to one direction pattern catching.

To achieve leading pulse control, second pulse blanking circuits have been provided in prior tracers that in response to a first pulse from the photocell, derive a blanking signal that blanks the second pulse so that the sample and hold circuits respond only to the leading pulse. The effect of this circuitry is that line catching can only be unidirectional, either clockwise or counterclockwise, without selectivity. As the scan path approaches the pattern the first intersection of the scan path with the line will provide the first pulse to the blanking circuit and the blanking circuit will thus always blank the second pulse (or vice versa). Since the first pulse is always on one side of the scan path, automatic tracing always proceeds in the same direction.

The inability of prior optical pattern tracing systems to easily preselect the tracing direction represents a severe limitation in the capability of these systems.

A further problem in prior art optical pattern tracing systems that incorporate line catching and locking circuitry is that these systems normally follow the edge of a line-pattern and sometimes use steering corrections or time delay of variable preset magnitude to introduce error signals that compensate for the displacement error caused by the distance between the edge and center of the line.

The second pulse blanking circuit described generally above for blanking the trailing pulse so that the sample and hold circuits respond only to the leading pulse in the direction of movement, also introduces a serious error into the system. An exemplary second pulse blanking system used with rotary scanners incorporates a one-shot flip-flop triggered by the first steering pulse from the photocell and used to mask the second pulse. This one-shot is typically set for a duration of approximately three-quarters of a scan path cycle time. Such an approach works well when pattern lines are well drawn and free from imperfections, but when this is not the case and the first pulse does not appear, the one-shot is triggered by the next available pulse which would be the second pulse resulting in the tracer reversing its direction along the pattern-line.

It is a primary object of the present invention to ameliorate the problems noted above in control circuitry for optical pattern tracing systems of the type having a closed scan path.

SUMMARY OF THE PRESENT INVENTION

In accordance with the present invention an improved optical pattern tracing system is provided of the type having a tracing head with a scanner that projects a photocell in a closed scan path on a line-pattern including a pattern approach and catching control circuit that enables the operator in advance of approach to select on a console either clockwise or counterclockwise direction of travel on the pattern. The catching control circuitry is provided with a complete line detector particularly suited for shallow approach angles to the line that initiates switching from manual control to automatic control only after two pulses per scan have been received from the photocell. Additionally, a second pulse blanking circuit is provided that is operable during the automatic mode to blank the second steering pulse from the photocell even though the selected first pulse is not received for one or more scan cycles because of imperfections in the line.

Toward these ends, the present optical pattern tracing system is provided with a resolver connected to receive four out-of-phase sine waves produced by a conventional sine wave generator. The resolver has an angularly positionable arm in which a sine wave is produced having a phase ($\phi$+180 degrees) where $\phi$ is the angle of the arm. The output of the resolver is fed through a high gain amplifier and a one-shot flip-flop to produce a pulse train having a phase selected by the operator for purposes of manual steering. Signals from the manual resolver are fed through a switching logic circuit and a direction memory circuit to conventional sample and hold circuitry to select the DC value of sine and cosine waves fed thereto by the sine wave generator to drive the X and Y servos of the associated machine slide in the direction selected manually by the operator. Thus the manual control pulses become the temporary steering pulses for the tracing system during pattern-line approach.

A pattern direction selection circuit is provided according to the present invention that permits the operator to preselect either a clockwise or a counterclockwise catch on the pattern-line. The direction selection circuit utilizes the principle that the first appearing pulse from the photocell at initial scan path-line intersection during approach is always on a predetermined side of the scan path since scan motion is undirectional. Knowing the position of the first pulse, the direction selection circuit blanks one pulse for clockwise catching and the other for catching in the opposite direction. Thus only one steering pulse per scan revolution is provided which is necessary because the sample and hold circuitry described above can accept only one steering pulse, or sampling pulse, per cycle.

The direction selection circuit provides, in response to the operator's selection on the control panel, a blocking signal for each of the first and second pulses from the photocell prior to the time the scan path has initial intersection with the line-pattern during approach. Once the line is caught and the tracer moves in the preselected direction, the blocking signal is promptly removed because otherwise subsequent steering corrections dictated by the line itself might become impossible and the tracer would lose the line.

An important aspect of the direction selection circuit is that it responds to increasing tracing speeds to remove the blocking signal much sooner after catching than at low speeds. This maintains a substantially constant travel distance for the tracer after initial line intersection regardless of tracing speeds.

The direction selection circuit derives the blocking signal from signals from the manual resolver without the need for any additional signal generation.

A dual pulse detector circuit is provided that responds to initial signals from the photocell for switching from manual control to automatic steering of the tracer head only after the scan path is completely over the line. It is sometimes required that catching be initiated at very low speed and/or at very shallow angles, e.g. below 10 degrees, between tracer approach and pattern direction. When the scanner approaches a pattern-line, at initial intersection only one pulse per scan revolution is obtained until the scanner is positioned sufficiently far across the line so that two pulses per revolution are obtained. It will be recalled that the blocking signals disappear a predetermined time after initial line intersection by the scan path. If, because of very slow speeds or very shallow approach angles, the scan path travels a distance exceeding the blocking distance before the two pulses per revolution appear from the photocell, the blocking signal is removed before the desired scanning pulse has appeared. If this occurs then the system may be under the control of the other scanning pulse and the tracer may move in a direction opposite to the one selected by the operator. To prevent this from happening, the dual pulse detector reports the presence of pattern detection to the direction selection circuit to remove blocking only after two pulses per scan revolution are present. The dual pulse detector circuitry also controls switching from manual to automatic control shortly before the blocking signals are removed.

The present tracing system is provided with a line center detector that enables the tracer to accurately follow either the center of the line, regardless of line width, or a right or left edge of the pattern to provide vastly improved tracing control without requiring any of the steering compensations found in prior tracer systems. As the photocell path traverses a line during approach eventually a symmetrical scan is obtained where the center of the scan coincides with the center of the line. Assuming that the lines are dark against a light background, the photocell signals have negative peaks that correspond in phase to the geometric center of the line. The line center detector precisely pinpoints the negative peaks by electrical differentiation and a high gain amplifier that identifies the zero crossing of the differentiated signal. A selectively operable coupling circuit is provided for the line center detector that nullifies the signal differentiation during edge tracing and an inverter allows accurate edge tracing selectively with either the white to black transition of the pattern or the black to white transition to obtain right edge or left edge tracing.

After the pattern has been caught, and the approach circuitry including the direction selection circuit no longer blocks a selected one of the steering pulses, a direction memory circuit operates to eliminate the unwanted second pulse per revolution that the scanner produces, even though the selected steering pulse does not appear (after the line has been caught) for one or more scan cycles because of imperfect lines. (Only one pulse per revolution can be accepted by the electronic resolver.)

The direction memory is provided with a one-shot that synchronizes a phase locked loop that includes a free-running oscillator. In the absence of a few of the selected steering pulses to the one-shot, the phase locked loop though no longer synchronized and drifting somewhat, will in relation to the scan frequency drift only slowly in phase and continue to block the unwanted steering pulse. Thus the system is capable of dealing with poor patterns having small gaps without abrupt reversals when gaps occur. This direction memory circuit greatly improves line following ability without affecting sharp cornering performance, since the phase correction response of the phase locked loop is quite fast.

BRIEF DESCRIPTION OF THE DRAWINGS

FIG. 3 is an enlarged fragmentary view of the photocell assembly illustrated in FIG. 2;

DETAILED DESCRIPTION OF THE PREFERRED EMBODIMENT

Figures 1, 2:
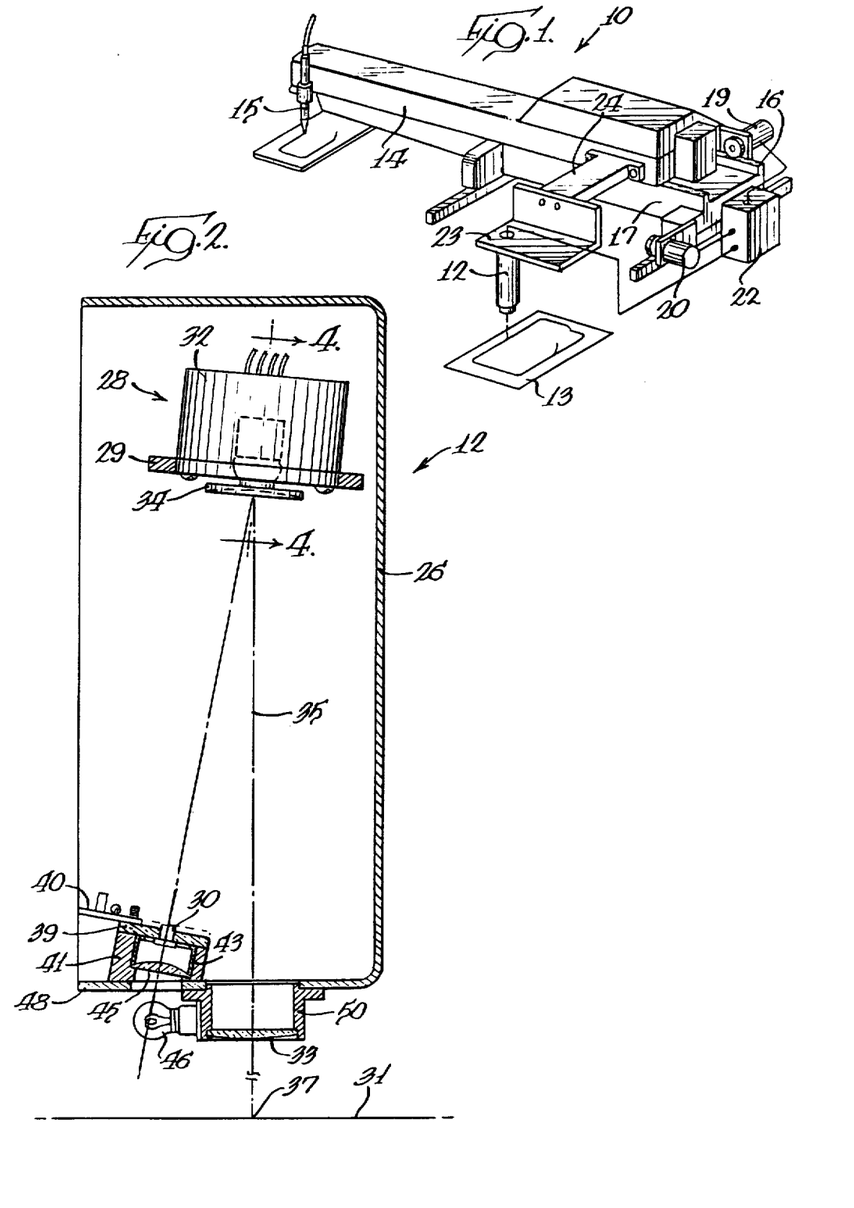
FIG. 1 is a perspective view of an optical pattern tracing system according to the present invention, positioning a flame cutting tool.
FIG. 2 is an enlarged view, partly in section, showing the tracing head subassembly illustrated in FIG. 1.

Referring to the drawings, and particularly to FIG. 1, a flame cutting machine 10 is illustrated having a tracing head 12 that follows a pattern 13 and provides control signals for shifting a machine slide 14 about two axes controlling the position of a flame cutting tool 15. The slide 14 is reciprocably mounted on way 16 carried by a transversely reciprocable slide 17, to provide two axes motion for the tracing head 12 and the flame cutting tool 15. Slide 14 is driven by servomotor 19 and slide 17 is driven by servomotor 20 from a control console 22 provided with control signals by the tracing head 12.

With the exception of the tracing head 12, the general description of the flame cutting machine 10 above is conventional, although it should be understood that the present tracing system can be used to control the movement of other tools besides flame cutting tools.

The tracing head 12 is non-rotatably mounted on a bracket 23 above pattern 13 that is carried by slide 14 from an arm 24 fixed to the slide 14.

As seen in FIG. 2, the tracing head 12 includes a generally rectangular housing 26 that is non-rotatably fixed to frame 23. An optical scanner 28 is mounted in housing 26 on an angularly positioned support frame 29 and serves to direct the image of a photocell 30 onto a pattern 31 through a lens 33. The scanner 28 includes an annular housing 32 carried by frame 29 and a mirror 34 mounted for pivotal movement about two orthogonal axes. The mirror 34 is concave, although it may be desirable under certain conditions for it to have a flat rather than a concave reflecting surface. The mirror 34 is angularly positioned along with frame 29 such that when at rest, it projects photocell 30 on an axis coincident with a reference 35 that is the geometric axis of lens 33 onto a reference point 37 on the pattern.

A spot finder is provided to assist the operator in easily locating the area on the pattern being scanned. Toward this end, the photocell 30 is supported in a clear plastic plexiglass holder 39 angularly supported in housing 26 by an annular frusto-cylinder 41. A printed circuit board 40 is mounted on holder 39 for processing control signals from photocell 30. The annular support 41 has a cylindrical diaphragm 43 and a condenser lens 45 mounted therein that projects light from a flood lamp 46 to the mirror 34 around the photocell 30. To obtain maximum light intensity, the lens 45 is a condenser lens that focuses the filament of lamp 46 on mirror 34. The diaphragm 43 with the photocell 30 outline and define a ring of light which is projected by mirror 34 around the axis of the mirror 34 regardless of its position and therefore, it is always concentric with the scan spot. Flood lamp 46 is fixed to the housing 26 and is positioned below lower portion 48 of the housing so that it illuminates the pattern 31. The intensity of the ring of light reflected from the flood lamp 46 by the mirror 34 onto the pattern is quite a bit higher than the light that reaches the pattern 31 directly from flood lamp 70 so that it is very clearly visible to the operator.

The geometric or optical axis of the mirror 34 nutates about an axis during scanning and when it does so the ring of light projected from the flood lamp 46 by the mirror 34 onto the pattern scribes an annular or circular high intensity light area that enables the operator to locate the scanned area regardless of the offset nutational axis of the mirror 34 with respect to the fixed reference axis 35.

The lens 33 is mounted in a lens holder 50 fixed to the lower housing 48 of the tracing head and it has a long focal length that does not significantly contribute to the focusing of the optical system.

The scanner 28 includes two perpendicularly related electromagnetic stationary coils that deflect mirror 34 which is supported in the scanner by a transverse diaphragm that carries a permanent magnet shown in dotted lines in FIG. 2. Out of phase, alternating signals in each of these coils cause pure nutational motion of mirror 34 around the static axis of the mirror. By applying equal amplitude alternating signals of 90 degrees phase difference to these coils, the mirror axis describes a cone of which the top is approximately coincident with the center of the mirror and the resulting scan path of the optical system on the pattern 31 is annular in shape. By providing unequal amplitude signals to these coils, or signals less than 90 degree phase shift, the mirror 34 scribes a cone projecting an eliptical scan path on pattern 31.

Figure 3A:
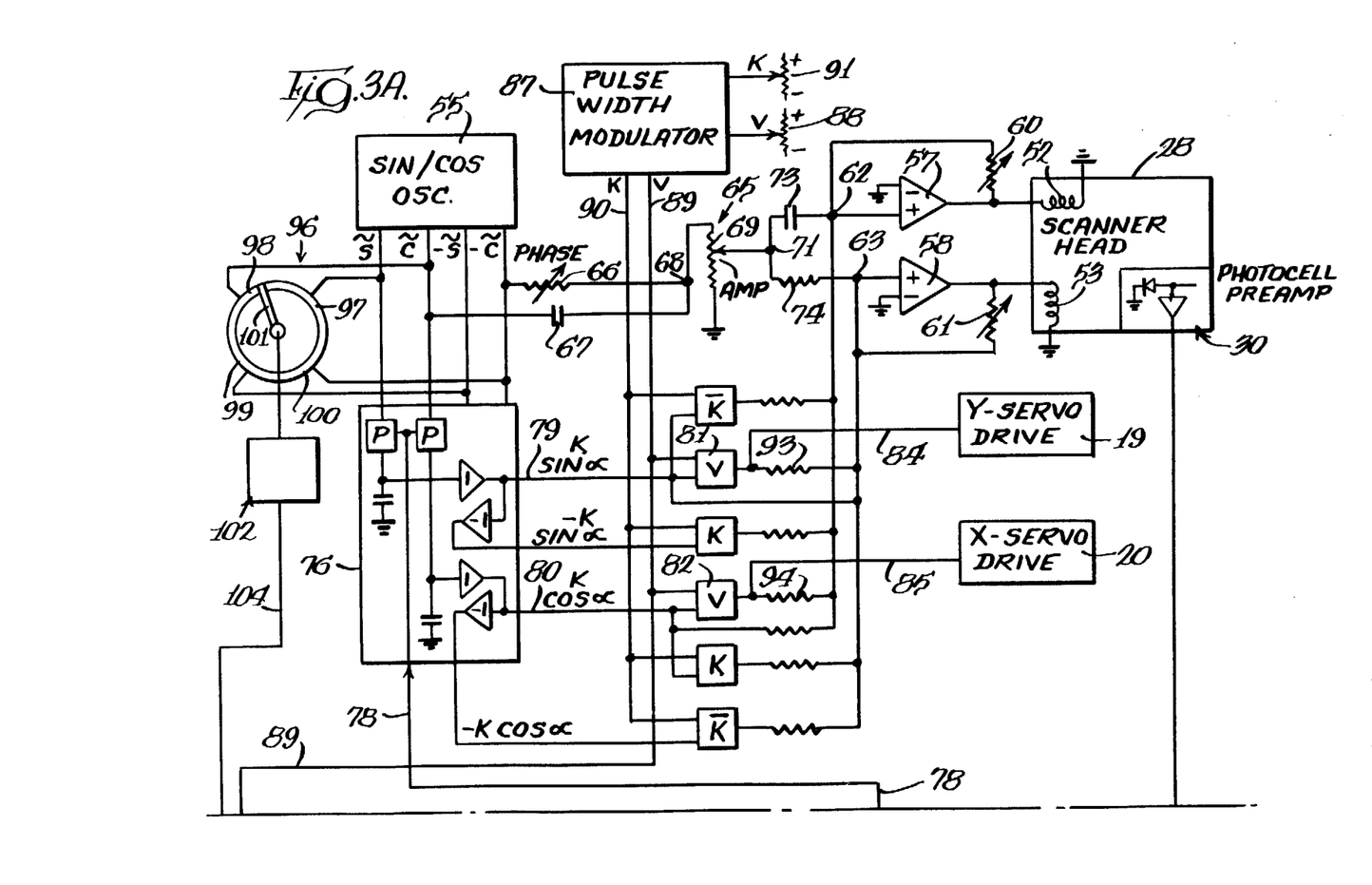
FIGS. 3A and 3B are block diagrams of the control circuit and manual control panel for the present optical pattern tracing system.
Figure 3B:
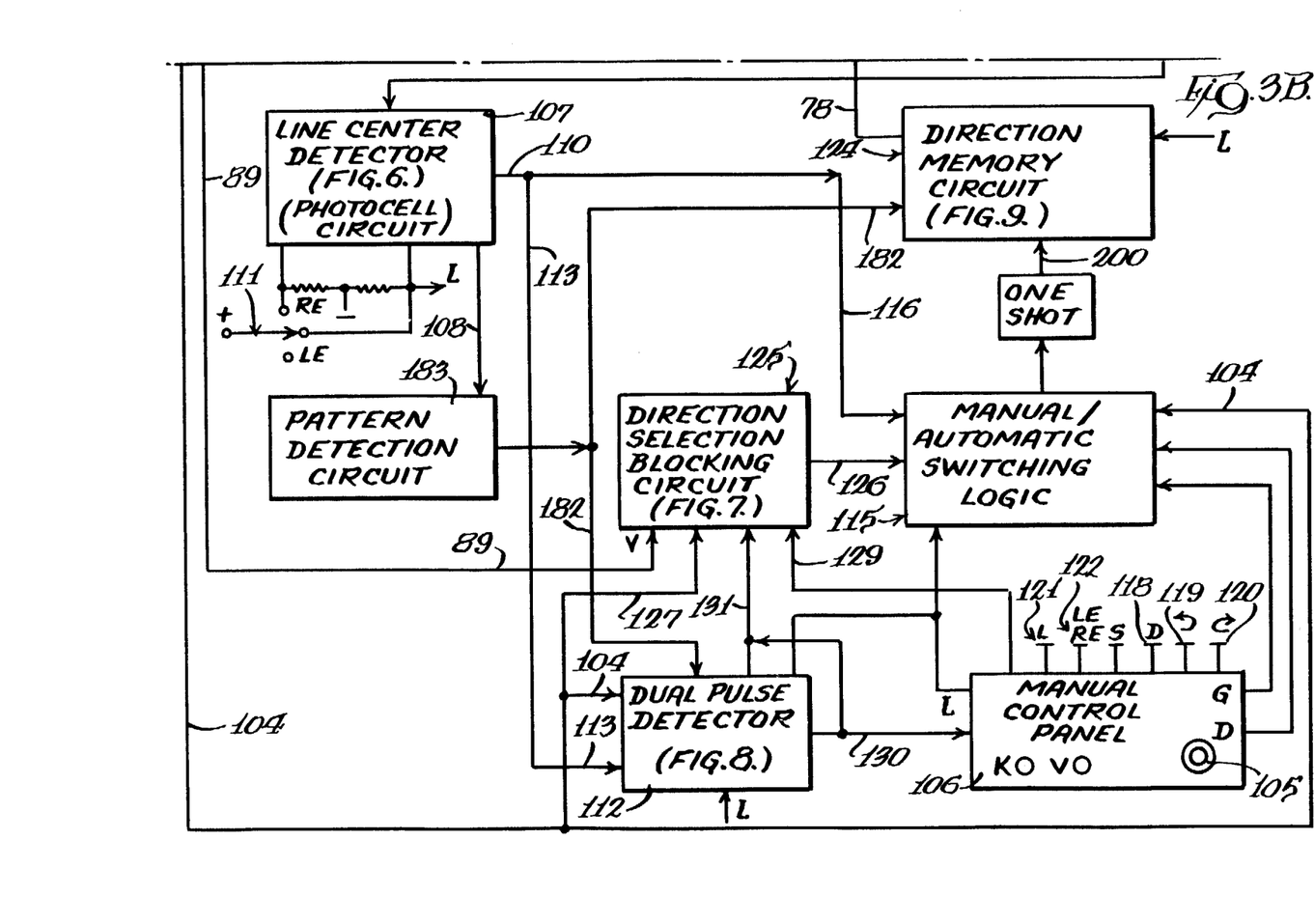

A partly schematic block diagram control circuit for the present optical pattern tracing system is illustrated in FIGS. 3A and 3B for driving the Y-servo 19, the X-servo 20, and coils 52 and 53 in scanner 28. Viewing FIG. 3A, scan signals originate from a reference oscillator 55 which is a four-phase sine wave oscillator producing sine waves of equal amplitude 90 degrees phase shifted. The coils 52 and 53 in the scanner head are fed from operational feedback amplifiers 57 and 58 respectively. Voltage feedback is provided in these amplifiers through variable resistors 60 and 61 to summing points 62 and 63.

The alternating signals impressed on coils 52 and 53 to provide the nutating motion of mirror 34 originate from the sine/cosine oscillator 55 through a phase shifter 65. The phase shifter 65 is provided to compensate for the inductance of the scanner coils 60 and 61. In the phase shifter a variable resistor 66 and a capacitor 67 are connected to the cosine outputs of the sine/cosine oscillator 55 in a fashion such that the amplitude of the signal at point 68 remains substantially constant. Resistor 66 controls the phase of the signal at point 68. The signal at point 68 is fed across an amplitude control resistor 69 to summing points 71 and 62 across capacitor 73 and resistor 74 which maintain a 90 degree phase shift between the signals applied to the summing points from the phase shifter 65. In this manner the phase shifter 65 applies the cosine signal to amplifier 57 and the sine signal to amplifier 58 which define the radius of the scan circle as the maximum amplitude of these signals.

A conventional electronic resolver 76 is provided as shown in FIG. 3A that receives the four out-of-phase sine waves from the sine/cosine oscillator 55 and utilizes control signals in line 78 from photocell 30 after being processed by the line center detector, direction selection circuit, the dual pulse detector, and the associated switching logic shown in FIG. 3B. The electronic resolver 76 is conventional by itself and functions basically to select instantaneous values of the sine and cosine waves generated by the oscillator 55 at time intervals determined by the phase of the processed signals in line 78. Output signals from resolver 76 in lines 79 and 80 are modulated by speed control gates 81 and 82 to provide slowly varying DC signal levels in lines 84 and 85 for driving the Y-servomotor 19 and the X-servomotor 20. The AC components of the signals in lines 84 and 85 are filtered out by the low-pass servo-amplifiers.

The speed control gates are driven by a pulse width modulator 87 having a variable resistor 88 that enables the operator to preselect the desired tracing speed. The pulse width modulator 87 produces a pulse width modulated pulse train in line 89 to gates 81 and 82 that represent the desired tracing speed. Pulse width modulator 87 also produces a second pulse width modulated signal in line 90 as preset on resistor 91 by the operator to gates K to control the side offset of the scanning circle to provide kerf offset adjustment for the system.

The signals in lines 84 and 85 are also fed through current translating resistors 93 and 94 into the summing current points 62 and 63 to represent part of the forward offset for the mirror nutation.

The summing points 62 and 63 combine the periodic signals from the phase shifter 65 with slowly varying DC signals derived by modifying signals from the sine/cosine resolver 76 with the pulse width modulating circuitry exemplified by gates $\overline{K}$,V(81), K,V(82), K,$\overline{K}$ in FIG. 3A to provide nutational motion of the scan mirror 34 around the offset position at the mirror.

As seen in FIG. 3A, a manual resolver 96 is provided for producing a pulse train having a phase angle selected by the operator to drive the tracing head in the desired direction when approaching a pattern-line. Since the phase of the pulses in line 78 produce the desired steering direction, the manual resolver 96 provides any desired phase angle variation in what is here referred to as a manual control pulse train. The manual resolver 96 is a potentiometer having stationary arcuate wound segments 97, 98, 99, and 100 engaged by a rotatable wiper element 101 that is the output from the resolver. The signal in wiper element 101 is sine wave of phase ($\phi$+180 degrees) fed through a high gain amplifier circuit 102 that includes a one-shot flip-flop that produces a pulse train in line 104 suitable for manual steering. The operator selects the appropriate angular position of wiper 101 by rotating control knob 105 on control panel 106 illustrated in FIG. 3B.

The pattern-line approach and catching circuitry illustrated in FIGS. 3A and 3B includes a line center detection circuit 107 that provides signals to the remaining approach and catching circuitry in FIG. 3B indicating; firstly, the very initial detection of a line upon first intersection of the scan path therewith, and secondly a pulse train in line 110 representing the true center of the line being traced regardless of the width of the line as long as the line is narrower than the diameter of the scanning path. Additionally and alternatively circuit 107 provides in line 110 a signal representing the right or left edge of a traced edge as selected by switch 111. Switch 111 may be located on the manual control panel 106 rather than its location shown in FIG. 3B. The line center detector 107 applies a pulse train in line 110 with the leading edges of the pulses phased with the center of the line, or selectively the edges of a pattern, to a dual pulse detector 112 through line 113, and also to a manual-automatic switching logic circuit 115 through line 116. In the line center detection mode, the line center detector 107 differentiates the peak value of the signals from the photocell 30 to produce a pulse train having a phase coincident with these peak values to achieve true line center detection because the negative peaks of the signals from the photocell correspond to the geometric center of the line.

To initiate the line approach and catching mode, the operator first selects the center line tracing mode by depressing self latching switch 121 on the control panel 106; then depresses the D switch 118 which activates a manual directional control latch, depresses one of the switches 119 or 120 for counterclockwise or clockwise catching, and then manipulates the control knob 105 for the manual resolver 96 to apply a manual pulse train to the sample and hold circuitry in the resolver 76 through line 104, manual-automatic switching logic 115, directional memory 124 and line 78. This drives the tracing head toward the line in the direction selected by the angular position of control knob 105.

After line detection, the manual-automatic circuit 115 switches the manual control signals in line 104 off and gates signals from the line center detector 107 to the direction memory and the resolver 76 to place steering control under the photocell signals. Prior to that switching and as the tracing head is approaching the line, line detector 107 provides no signals in lines 110, 113, and 116. In advance of the first appearing signals from the line center detector 107, direction selection circuit 125 develops a blocking signal that selectively blocks either the first or the second pulse appearing in the switching logic 115 from the line center detector through line 116. The direction selection circuit 125 selects either the first or the second pulse for blocking depending upon which of the directional switches 119 or 120 on the control panel 106 is preselected by the operator. If the mirror 34 is scanning in a counterclockwise direction, for example, the first pulse from the photocell 30 and line center detector circuit 107 in line 116 is produced at the right side of the scan circle as the scan spot initially intersects the line during approach. If clockwise switch 120 has been selected by the operator, direction selection circuit 125 provides blocking signals to the switching logic 115 through line 126 to block the second pulse received from line center detector 107 so that the first pulse becomes the steering pulse for the resolver 76 and the tracing head moves in a clockwise or right direction after catching the pattern-line. Alternatively, if counterclockwise switch 110 is depressed by the operator, the direction selection circuit 125 will blank the signal in logic circuit 115 produced by the initial intersection of the scan path with the line from the line center detector 107. It is capable of doing this because the direction selection circuit 125 provides blocking signals to the switching logic circuit 115 in advance of, or in anticipation of, signals in 116 from the line center detector 107.

The direction selection circuit 125 develops blocking signals from the manual resolver 96 through lines 104 and 127. In this way, the blocking signals are approximately phased with the direction of approach to the pattern-line and the manual resolver 96 is a convenient source for these signals. Since the sample and hold circuitry in the resolver 76 can sample only once per cycle and the signals from the photocell 30 occur twice per cycle, the direction selection circuit 125 effectively blocks the unwanted signal in the manual-automatic switching logic 115 to achieve the desired initial direction control. The unblocked pulse from the switching logic 115 automatically steers the system in the preselected clockwise or counterclockwise direction.

The blocking signals from the direction selection circuit 125 are promptly removed a predetermined time after complete line detection so that steering corrections dictated by curves in the line do not become impossible because steering signals are blocked by the blocking function of the direction selection circuit 125. However, the blocking signals from the direction selection circuit 125 continue a predetermined time after complete scanner line positioning is sensed by dual pulse detector 112, and this time is variable automatically to achieve a constant distance of tracer travel from complete pattern detection to the point of removal of the blocking signals in line 126.

The direction selection circuit 125 receives a signal through line 129 indicating either clockwise or counterclockwise direction selection from one of the manually operable switches 119 and 120. After the direction selection circuit 125 receives a signal from dual pulse detector 112 indicating complete line traverse by the scanner 28, blocking signals in line 126 continue for a short time in inverse proportion to a pulse width modulated pulse train in line 89 (indicating tracing speed, V) so that for higher tracing speeds the blocking signal time will decrease and for lower tracing speeds the blocking time will increase to achieve the desired constant distance travel of the tracer head after line detection before blocking signal removal. This constant "blocking distance" is approximately 0.25 inches.

In the very high speed ranges of tracing, above 100 inches/min., the direction selection circuit 125 increases the blocking signal time and hence "the blocking distance" to compromise and accomodate for the possibility of the scan path overshooting the pattern-line. Above 100 inches/minute the "blocking distance" gradually increases to 0.75 inches. The extended blocking of the unwanted steering control signal enables the scan pattern to be brought back to the line after overshoot without losing identification of the desired selected steering control pulse in the switching logic 115. While this appears somewhat inconsistent with the direction selection circuit decreasing blocking time with increases in speed it represents a compromise only in the very high speed range of the tracer and not at normal speeds below 100 inches/min.

The dual pulse detector circuit 112 controls switching from the manual mode to the automatic mode and also provides a high level signal to the direction selection circuit 125 to indicate the complete presence of a line sensed by photocell 30. Dual pulse detector 112 receives the line center detection pulse train from line center detector 107 in line 113 and develops a high level output signal in line 130 to manual control panel 106 and line 131 to direction selection circuit 125 after the first two pulse scan of photocell 30. When the scanner approaches a pattern-line, at first only one pulse per revolution is obtained until the scanner is positioned sufficiently far across the line so that two pulses per revolution are obtained. A simple pattern detection circuit reports only the initial pattern line intersection as soon as pattern impulses appear, regardless of whether one or two pulses per scan revolution are present.

If the tracer, because of a shallow approach angle to the line or slow tracing speeds, travels a distance that exceeds the distance that the blocking signals appear in line 126 (i.e. the "blocking distance"), before the scan path completely traverses the line, the blocking signal may be removed too early and the wrong steering control pulse (e.g. the clockwise pulse instead of the counterclockwise pulse) may not be blocked and when applied to the sample and hold circuitry in resolver 76 may drive the tracing head in the opposite direction from that selected. To prevent this, dual pulse detector 112 assures that complete pattern catching has been achieved prior to removal of the blocking signals by continuing the blocking signals in line 126 until after two pulses per scan revolution have been received from line center detector 107.

In addition to initiating the time period for removal of the blocking signals in direction selection circuit 125, dual pulse detector 112 provides a complete pattern detection signal to the manual-automatic switching logic 115 through line 130, manual control panel 106 and line 132 to gate off the manual pulse train from line 104 and gate in the photocell pulse train in line 116 to direction memory 124. It should be noted that the dual pulse detector 112 switches the lines 104 and 116 in the switching logic circuit 115 from manual to automatic mode prior to removal of the blocking signals from direction selection circuit 125.

After the scanner has locked onto the pattern-line and the blocking signals from direction selection circuit 125 have been removed, the direction memory 124 serves to block the unwanted one of the two steering signals per scan cycle and to maintain the tracing direction as originally selected by the operator. The direction memory circuit 124 includes a free-running oscillator that is phase-locked to the desired steering pulse not blocked by the direction selection circuit 125. In the absence of a few of the selected steering pulses from the switching logic circuit 115 because of poor quality lines, the oscillator in direction memory 124, while no longer precisely phase-synchronized, will continue to block the unwanted steering control pulses from the line center detector 107 (through switching logic circuit 115) for several scan revolutions. This eliminates abrupt tracer reversal that otherwise results when gaps occur in the traced line.

In the case of edge tracing, the operator selects edge tracing by assuring that line switch 121 is "OFF" and edge-mode switch 122 is set for either left or right edge. In this mode direction selection circuit 125, dual pulse detector 112, direction memory circuit 124, and center line detector 107 are inoperative. Catching a pattern is achieved by manually approaching the pattern as in the case of line tracing and switching to automatic (under photocell control) as soon as the pattern detection circuit 183 actuates.

Approach Scan Signal Generation in FIGS. 4A, 4B, 4C, and FIG. 5

Figure 4A:
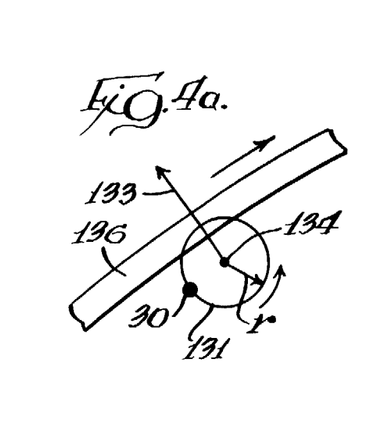
FIG. 4A is a diagramatic representation of a scan circle path at initial intersection with a line.
Figure 4B:
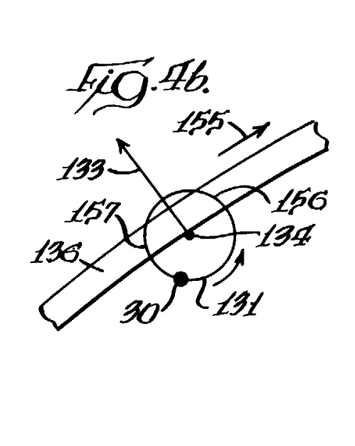
FIG. 4B is a diagramatic representation of a scan circle path after complete traversal of a line.
Figure 4C:
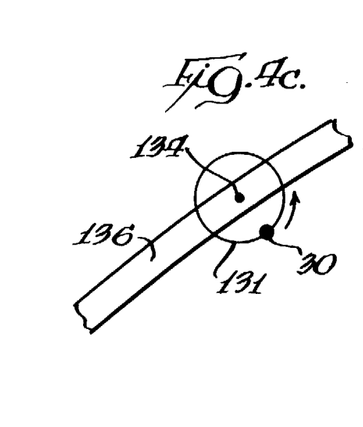
FIG. 4C is a diagramatic representation of a scan circle path centered on a line.
Figure 5:
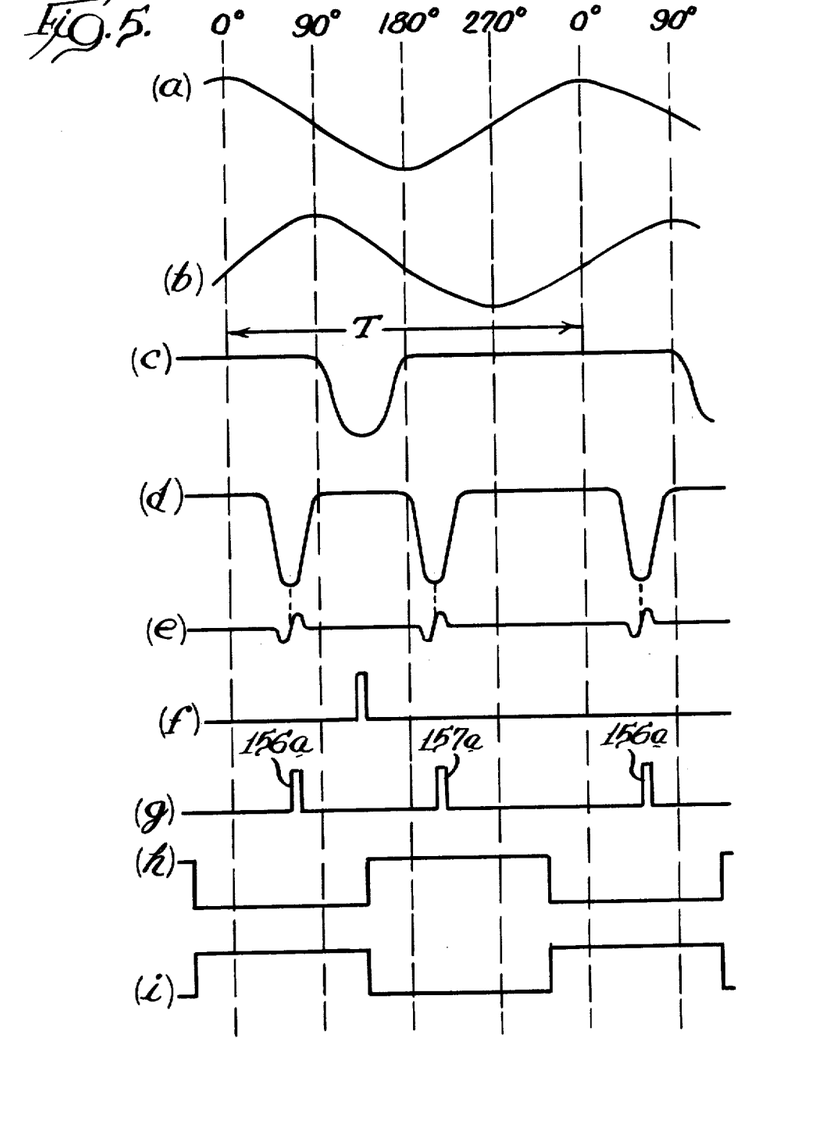
FIG. 5 is a series of waveforms produced in the tracer control circuit of FIGS. 3A and 3B.
Figure 6:
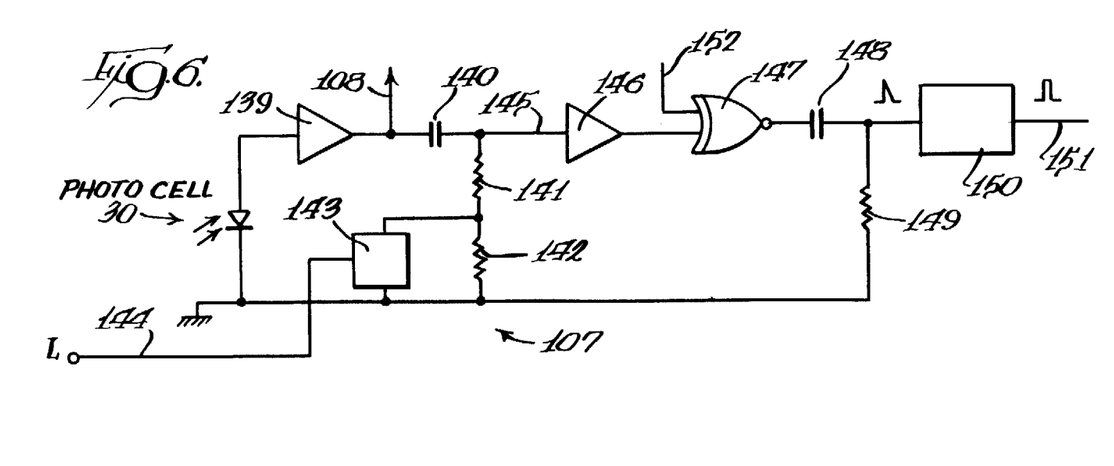
FIG. 6 is a schematic diagram of the line center detector circuit illustrated in FIG. 3B.
Figures 7, 8:
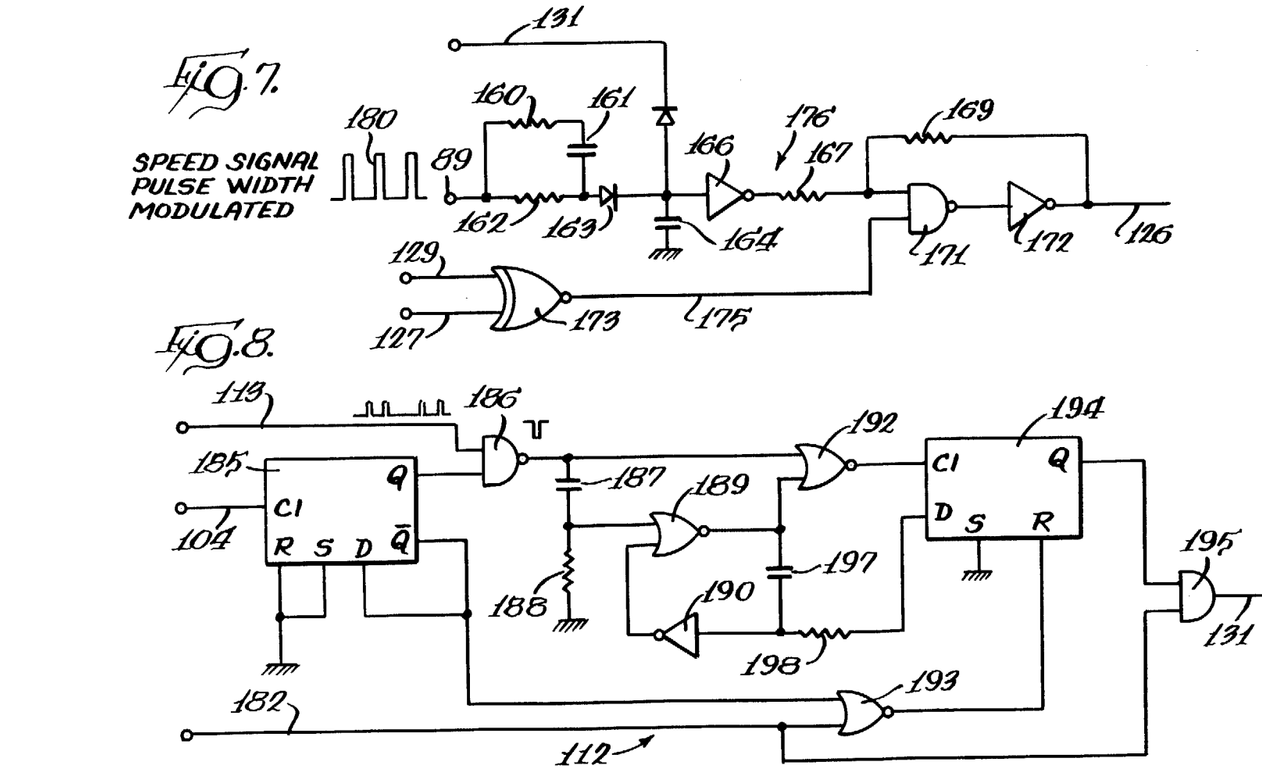
FIG. 7 is a schematic diagram of the direction selection blocking circuit illustrated in FIG. 3B.
FIG. 8 is a schematic diagram of the dual pulse detector circuit illustrated in FIG. 3B.

FIGS. 4A, 4B, and 4C illustrate the scan path during approach to an exemplary line and taken in conjunction with the signals illustrated in FIG. 5 provide an explanation for the major schematic circuits illustrated in FIGS. 6, 7, and 8. FIGS. 4A, 4B, and 4C illustrate a line 136 being scanned by a photocell scanner describing a substantially circular projected path 131 of photocell 30 in a counterclockwise direction around scan center 134. The scan radius is r. FIG. 5 shows in waveform 5a a timing diagram of scanner deflection (mirror 34 in FIG. 1) in the X-direction, and in waveform 5b a similar timing diagram of scanner deflection in the Y-direction. These instantaneous deflections are substantially sinusoidal, though not necessarily of equal amplitude. The angular position of photocell 30 (actually the projected scan spot on the pattern) relative to center 134 is shown along the horizontal axis in FIG. 5, and the time cycle for one full scan of 360 degrees is T. When a line is approached in a direction 133, first contact is made when the projected photocell path just touches the line, but does not yet traverse it as depicted in FIG. 4A. At this point, the photocell 30 produces only one scan signal for each complete scan cycle. Continuing the approach in direction 133 and as depicted in FIG. 4B, a position is reached where the photocell 30 completely traverses the line. At this point the photocell 30 provides the first cycle where two signals per revolution are produced. Eventually a symmetrical scan is obtained as shown in FIG. 4C where the center 44 coincides with the center of the line. Assuming that the line 136 is dark against a light background, the photocell signal corresponding to the scan position at FIG. 4A. is illustrated as waveform 5c in FIG. 5 producing one pulse per scanner revolution, and photocell signals corresponding to the scan position of FIG. 4B are illustrated as waveform 5d.

Line Center Detector FIG. 6

The schematic illustrated in FIG. 6 corresponds to the line center detector 107 shown in block diagram form in FIG. 3A. The negative peaks of the photocell signal waveform 5d in FIG. 5 correspond to the geometric center of the line. The signal from the scan photocell 30 after amplification in amplifier 139, which is not limiting, is differentiated (in the line following mode) by capacitor 140 and resistor 141. Resistor 141 (in the line following mode) is grounded by switch 143 when the line mode signal 144 is high. The RC constant of this differentiating network is typically as small 50 μsec. The resulting signal 145 is shown in FIG. 5 as waveform 5e. After high amplification in amplifier 146 and gate 147, the subsequent leading edge differentiator 148 and 149 and pulse forming one-shot 150 together provide a signal at 151, shown as waveform 5g in FIG. 5. Waveform 5g has pulses 156a and 157a with their leading edges phased with the peaks of the photocell signals in waveform 5d.

In the pattern edge mode, line 144 is low (console switch 121) and switch 143 is then opened and the RC network (resistor 141, capacitor 140) becomes a coupling network with a high RC-constant (approximately 20 msec.). In this mode no differentiation takes place and the pulses on line 151 coincide with one of the edges of the pattern-edge. The component 147 is an exclusive-OR gate which inverts when line 152 is low and does not invert when line 152 is high. Line 152 is set by switch 122 on console 106. When line 152 is low, the pulses on line 151 coincide with a white-to-black transition and when line 152 is high they coincide with a black-to-white transition. In this manner the tracer can be preset for right edge tracing or left edge tracing.

Direction Selection Circuit of FIG. 7

The schematic of FIG. 7 corresponds to the direction selection and blocking circuit 125 illustrated in FIG. 3B in block diagram form. Viewing FIG. 4B and pulse waveform 5g in FIG. 5, when it is desired to catch a pattern-line using a clockwise steering correction, i.e. from direction 133 to direction 155 in FIG. 4B, the pulse produced at crossing 156 is selected as the steering pulse, and when it is desired to trace in the opposite direction (counterclockwise) the pulse provided at crossing 157 is selected as the steering pulse, and this philosophy assumes that the scan movement of the photocell 30 is a counterclockwise scan path. The pulses corresponding to these crossings are marked 156a and 157a in waveform 5g in FIG. 5. To accomplish this selection, the schematic circuit illustrated in FIG. 7, namely the direction selection circuit 125, eliminates, during the catching process, pulse 156a for counterclockwise catching, or selectively pulse 157a for clockwise catching. Elimination is accomplished by gating, using the manual resolver signal of line 127 (FIG. 3B) as depicted in FIG. 5h or its inverse signal as depicted in FIG. 5i. It should be noted that resolver 76 can sample only one pulse per complete cycle.

The dual pulse detector 112 illustrated schematically in FIG. 8 provides a signal in line 131, a high logic level, as soon as a pattern-line is completely detected as explained in more detail below with reference to FIG. 8. This allows voltage at capacitor 164 to rise since it is no longer held low by diode 165. The signal representing speed in line 89 is as described above a pulse width modulated signal 180, repeated at a suitable rate of approximately 2,000 hz., and represents tracing speed. After line 131 goes high, capacitor 164 charges up to a high logic level through resistor 162 and diode 163, at a rate proportional to the width of the pulses in the speed signal 180. Therefore, at high speed settings for the tracer, capacitor 164 charges faster than at low speed settings. As soon as capacitor 164 reaches the crossover level of inverter 166, a flip-flop consisting of gates 171 and 172 and resistors 167 and 169 goes to a low level on line 126 (see also FIG. 3B, line 126), forced to do so by a low level at the output of gate 166.

The desired blocking signal in line 127 from the manual resolver which is repeated or inverted in exclusive-OR gate 173, selectable by logic level 129 (for clockwise or counterclockwise catching), is no longer passed through gates 171 and 172 to line 126, whenever line 176 is low. Thus the blocking signal appears on line 126 for a limited time after pattern catching depending on the preselected speed setting as represented by signal 180. The gating of pulses 156a or 157a is preselected by choosing the logic level in line 129 to be low or high, and this is effected by the counterclockwise and clockwise switches 120 and 119 shown on the manual control panel 106 in FIG. 3B.

As noted above, under certain conditions, particularly in systems capable of very high speed tracing, wherein overshoot of the pattern-line may become considerable, it is advantageous to increase the "blocking distance" somewhat in the higher speed ranges only, to ascertain completion of the overshoot transient before removal of the blocking signals. Thus, if overshoot occurs, the scan pattern path can be repositioned over the line without losing the selected one of the pulses 156a or 157a by premature removal of the blocking signals. Toward this end, resistor 160 and capacitor 161 illustrated in FIG. 7 are selected to define a filter that decreases the charging rate of capacitor 164 as pulse width in line 180 increases to delay blocking signal removal when in the upper speed ranges.

Dual Pulse Detector Circuit of FIG. 8

The schematic illustrated in FIG. 8 represents the dual pulse detector circuit 112 illustrated in FIG. 3B. In FIG. 8 the input 182 is a pattern detection signal from a pattern detector 183 illustrated in FIG. 3B which merely provides high or low level logic from the output of amplifier 139 in the FIG. 6 line detector circuit. Input 113 is the pulse train from the line center detector 107, and input 104 is the approach signal from the manual resolver 96. The approach signal at 104 toggles a D flip-flop 185 producing a gating signal at the Q output which alternates between high and low during successive full scan revolutions. This signal is used to gate the scan signal 113 in gate 186, and its output pulse trailing edge sets the one-shot consisting of gates 189 and 190 and components 197 and 198, and if a second pulse appears when the one-shot is still set, it can pass through gate 192 to set flip-flop 194. Then the Q-output of flip-flop 194 goes high reporting the presence of two pulses per revolution of the scan.

This signal is then combined in gate 195 with the signal 182 from pattern line detector 183 to produce an improved signal on line 131 that is fed to both the direction selection circuit 125 and the manual-automatic switching logic circuit 115 through the control console 106. The one-shot 189, 190 is set for a time between one and two full cycles of the scanner, and flip-flop 194 is reset as soon as the pattern detector signal 182 goes to low indicating an off-pattern condition. In this case the $\overline{Q}$ signal from flip-flop 185 serves that purpose by being allowed to pass through gate 193 to the reset input of flip-flop 194.

Figure 9:
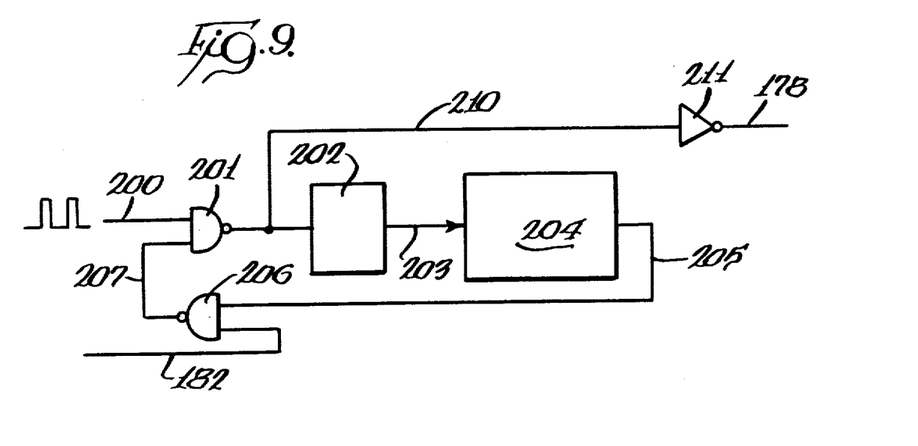
FIG. 9 is a schematic diagram of the direction memory circuit illustrated in FIG. 3B; and, FIG. 10 is a series of waveforms illustrating the operation of the direction memory circuit illustrated in FIG. 9.

Direction Memory Circuit of FIG. 9

Figure 10:
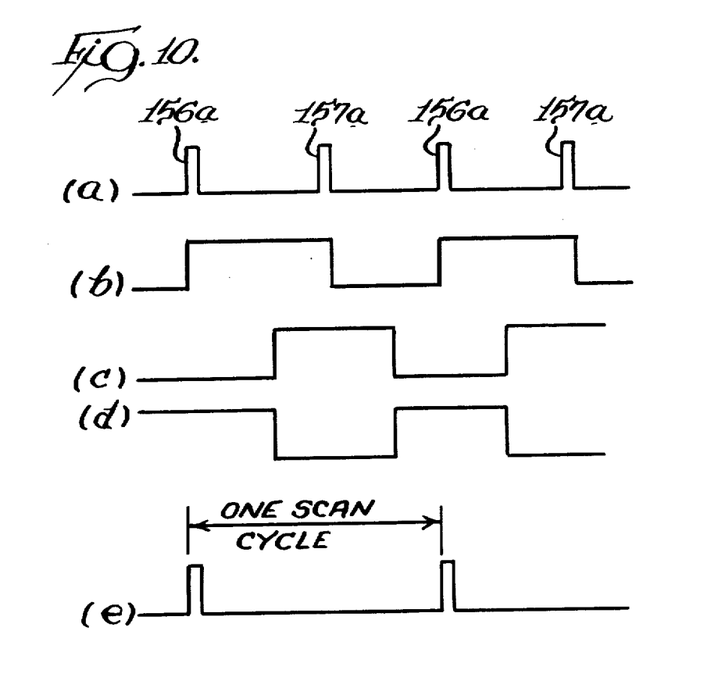

The schematic illustrated in FIG. 9 is the direction memory circuit 124 illustrated in block diagram form in FIG. 3B, and waveforms developed in this circuit are illustrated in FIG. 10. It will be recalled that the direction memory circuit 124 eliminates the second pulse per revolution that the scanner produces since only one pulse per revolution can be accepted by the electronic resolver 76. Both the first and second steering pulses per revolution appear at input line 200 in the circuit of FIGS. 8 and 9 (if they are not blocked by direction selection circuit 125). It will be recalled that as the direction selection circuit 125 terminates its blocking signals in line 126 to the switching logic circuit 115, two pulses rather than the selected directional steering pulse per revolution will appear at line 200.

Gate 201 admits the first selected directional steering pulse when line 207 is high to actuate a one-shot 202, used to synchronize a phase locked loop 204. The one-shot 202 is set to be "ON" during approximately one-half a scan cycle. The phase locked loop 204 includes an oscillator that is preset to run, before synchronization with the steering pulse, at a frequency very close to the scan frequency. The oscillator in the phase locked loop 204 is thus synchronized by the one-shot signal 203 at approximately 90 degrees phase shift as shown by waveform 10c in FIG. 10. The phase locked loop output signal 10c gated by the pattern detect signal 182 in gate 206 then becomes a gating signal in gate 201 in FIG. 10 for the desired steering pulse in line 200. (Waveform 10a in FIG. 10 on line 200 is the same as waveform 5g in FIG. 5.) Thus signal 210 only contains the selected one of pulses 156a, 157a, and if 156a has been selected the waveform 10e in FIG. 10 appears on line 78. Line 78 goes to the sample and hold circuit in the electronic resolver 76 illustrated in FIG. 3A.

The schematic of FIG. 9 acts as a direction memory because if one or more of the selected steering pulses does not appear on line 200 the phase locked loop 204, though no longer synchronized, will in relation to the scan frequency drift only slowly in phase. The non-selected pulses will not be admitted to gate 201 until the phase drift exceeds approximately 90 degrees. Additionally, the synchronization response in the presence of good scanner signals from high quality lines (in addition to the poor quality line detection capability) can be quite fast when needed to follow abrupt changes in line-pattern direction. This can be accomplished by the proper choice of filter components placed between a phase detector and a voltage controlled oscillator that form integral parts of phase locked loop 204.

I claim:

1. An optical pattern-line tracing system of the type having a tracing head with a scanner that projects a photocell in a closed path scan on the pattern and the photocell provides two line crossover signals for each complete scan path, including a signal generator for providing two out of phase signals, a sampling circuit for selecting instantaneous values of the out of phase signals to derive control signals for coordinate servo-motors that control the position of the tracing head over the pattern-line, and further including means for developing and applying manual control signals to the sampling circuit to drive the scanner toward the pattern-line, characterized by means for selecting the direction of movement of the tracing head along the pattern-line prior to the approach of the scan path to the pattern-line and including means for automatically catching the pattern-line after approach at substantially any angle.

2. An optical pattern-line tracing system of the type having a tracing head with a scanner that projects a photocell in a closed scan path on the pattern and provides two signals for each complete path of the scanner across the pattern-line to a control circuit that in response thereto derives control signals for coordinate servo-mechanisms that position the tracing head over the pattern-line, including means for generating manual control signals for the control circuit to drive the tracing head in approach toward the pattern-line, characterized by a clockwise or counterclockwise direction selection circuit for selectively determining either direction of movement of the tracing head along the pattern-line prior to positioning the tracing head over the pattern-line.

3. An optical pattern-line tracing system of the type having a tracing head with a scanner that projects a photocell in a closed scan path on the pattern and provides two signals for each complete path of the scanner to a control circuit that in response thereto derives control signals for coordinate servo-mechanisms that position the tracing head over the pattern-line, including means for generating manual control signals for the control circuit to drive the tracing head in approach toward the pattern-line, characterized by means for selecting the direction of movement of the tracing head along the pattern-line including means for selectively preventing transmission of either one or the other of the two photocell signals to the control circuit after initial intersection of the scan path with the pattern-line and including means for automatically catching the pattern-line after approach.

4. An optical pattern-line tracing system of the type having a tracing head with a scanner that projects a photocell in a closed scan path on the pattern and provides two signals for each complete path of the scanner across the pattern-line to a control circuit that in response thereto derives control signals for coordinate servo-mechanisms that position the tracing head over the pattern-line, means for generating drive signals for the scanner, including means for generating manual control signals for the control circuit to drive the tracing head in approach toward the pattern-line, characterized by means for selecting the direction of movement of the tracing head along the pattern-line including means responsive to the scanner drive signals for selectively preventing transmission of either one or the other of the two photocell signals to the control circuit when the scan path first intersects the line to be traced.

5. An optical pattern-line tracing system of the type having a tracing head with a scanner that projects a photocell in a closed scan path on the pattern and provides two signals for each complete path of the scanner across the pattern-line to a control circuit that in response thereto derives control signals for coordinate servo-mechanisms that position the tracing head over the pattern-line, including means for generating manual control signals for the control circuit to drive the tracing head toward the line, characterized by means for selectively preventing transmission of either one or the other of the two photocell signals to the control circuit at initial intersection of the scan path with the pattern-line, and means for disabling the means for preventing transmission of one or the other of the two photocell signals to the control circuit after the scan path intersects the pattern-line.

6. An optical pattern-line tracing system of the type having a tracing head with a scanner that projects a photocell in a closed scan path on the pattern and provides two signals for each complete path of the scanner across the pattern-line to a control circuit that in response thereto derives control signals for coordinate servo-mechanisms that position the tracing head over the pattern-line, including means for generating manual control signals for the control circuit to drive the tracing head along the pattern-line including means for selectively preventing transmission of either one or the other of the two photocell signals to the control circuit at initial intersection of the scan path with the pattern-line, means for disabling the means for preventing transmission of one or the other of the two photocell signals to the control circuit after the scan path intersects the pattern-line, and means for delaying the disabling of the means for preventing transmission of one or the other of the two photocell signals to the control circuit in response to decrease in the speed of the tracing head.

7. An optical pattern-line tracing system as defined in claim 6, characterized by means for selecting a high speed range for the servo-mechanisms, and means for delaying the disabling of the means for preventing transmission of one or the other of the two photocell signals to the control circuit in the high speed range of the servo-mechanisms to permit the tracing head to recapture the line in the properly selected direction if the scanner overshoots the pattern-line during approach.

8. An optical pattern-line tracing system of the type having a tracing head with a scanner that projects a photocell in a closed scan path on the pattern and provides two signals for each complete path of the scanner across the pattern-line to a control circuit that in response thereto derives control signals for coordinate servo-mechanisms that position the tracing head over the pattern-line, including means for generating manual control signals for the control circuit to drive the tracing head in approach toward the pattern-line, characterized by means for preselecting the direction of movement of the tracing head along the pattern-line to be traced including means for selectively developing blocking signals for each of the two signals from the photocell prior to the appearance of the first photocell signal as the scan path approaches its intersection with the pattern-line.

9. An optical pattern-line tracing system as defined in claim 8, characterized by means for removing the blocking signals after the scanner catches the pattern-line.

10. An optical pattern-line tracing system as defined in claim 9, including means for varying the speed of the tracing head, characterized by means responsive to increase in the speed of the tracing head for removing the blocking signals sooner to maintain the distance the tracing head moves from the instant of scan path intersection to blocking signal removal substantially constant.

11. An optical pattern-line tracing system as defined in claim 10, characterized by means for delaying the removal of the blocking signals in response to predetermined high tracing head speed to prevent the tracing head losing the preselected direction of travel in the event of pattern-line overshoot during approach.

12. An optical pattern-line tracing system as defined in claim 8, including means for varying the speed of the tracing head, characterized by means for detecting the initial intersection of the scanning path with the pattern-line, capacitive means charged at a rate proportional to tracing speed from the moment of detecting the initial intersection of the scan path with the pattern-line for delaying the removal of the blocking signal after the pattern-line is initially detected.

13. An optical pattern-line tracing system as defined in claim 12, characterized by means for developing a pulse width modulated signal representing the speed of the tracing head, and means for applying the pulse width modulated signal to the capacitive means to increase the charging time thereof with increases in tracing head speed.

14. An optical pattern-line tracing system as defined in claim 8, characterized by means for generating a train of pulses at any desired phase angle to provide manual control signals to the control circuit to drive the tracing head toward the pattern-line, said means for developing blocking signals being primarily responsive to said manual control signals.

15. An optical pattern-line tracing system as defined in claim 8, characterized by means for processing the first and second signals from the photocell to determine and provide signals representing the center of the line during line tracing including means for differentiating the signals from the photocell.

16. An optical pattern-line tracing system as defined in claim 8, characterized by means for detecting the initial intersection of the scan path with the pattern-line including means for providing a pattern-line detection signal only after two signals have been received from the photocell, and means responsive to the pattern detection signal for removing the blocking signal.

17. An optical pattern-line tracing system of the type having a tracing head with a scanner that projects a photocell in a closed scan path on the pattern and provides two signals for each complete path of the scanner across the pattern-line to a control circuit that in response thereto derives control signals for coordinate servo-mechanisms that position the tracing head over the pattern-line, including means for generating manual control signals for the control circuit to drive the tracing head in approach toward the pattern-line, characterized by means for receiving said photocell signals and blanking alternate ones of said photocell signals so that only one photocell signal per complete path is applied to the control circuit to control steering of the tracing head, means for generating manual control signals and applying them to the means for receiving the photocell signals to drive the tracing head during approach, means for selecting either direction of travel of the tracing head on the pattern-line after approach and catching including means for selectively blocking either the first or the second signal from the photocell to the control circuit upon initial intersection of the scan path with the pattern-line, means for terminating the manual control signals to the means for receiving the photocell signals after the pattern-line has been caught, and means for disabling the means for selectively blocking either the first or the second signal from the photocell a predetermined time after initial intersection of the scan path with the pattern-line.

18. An optical pattern-line tracing system of the type having a tracing head with a scanner that projects a photocell in a closed scan path on the pattern and provides two signals for each complete path of the scanner across the pattern-line to a control circuit that in response thereto derives control signals for coordinate servo-mechanisms that position the tracing head over the pattern-line, including means for generating manual control signals for the control circuit to drive the tracing head in approach toward the pattern-line, characterized by means for receiving said photocell signals and blanking alternate ones of said photocell signals so that only one photocell signal per each complete path is applied to the control circuit to control steering of the tracing head, means for selecting either direction of travel of the tracing head on the pattern-line after approach and upon catching including means for selectively blocking either the first or the second signal from the photocell to the control circuit upon intial intersection of the scan path with the pattern-line, said means for receiving and blanking the second of said photocell signals including a free running oscillator synchronized with the first of said signals received from the photocell to develop blocking signals for the second of the signals from the photocell so that in the temporary absence of a first signal because of poor pattern-line quality the free running oscillator will continue to provide blocking signals for the second of the signals from the photocell.

19. An optical pattern tracing system of the type having a tracing head with a scanner that projects a photocell in a closed scan path on the pattern and provides two signals for each complete path of the scanner across a pattern-line to a control circuit that in response thereto derives control signals for coordinate servo-mechanisms that position the tracing head over the pattern, including means for generating manual control signals for the control circuit to drive the tracing head in approach toward the pattern-line, characterized by means for receiving the first and second signals from the photocell, blanking one of the signals received, and applying the other signal to the control circuit to control steering of the tracing head, said means for receiving the first and second signals from the photocell including oscillator means for continuing blanking of the one signal from the photocell even though the other signal may not appear from the photocell during one or more complete scan paths.

20. An optical pattern-line tracing system as defined in claim 19, characterized by a one-shot for developing a signal phased with the first signal from the photocell, said oscillator means including a free running oscillator synchronized with the one-shot signal and providing blanking signals, and gate means controlled by the blanking signals and connected to receive both the first and second signals from the photocell for gating the other of the signals to the control circuit so that if the line is interrupted the oscillator will continue to provide substantially the same phased blanking signals and the one photocell signal will continue to be blanked and the tracing head will continue in the same direction without reversal.

21. An optical pattern-line tracing system as defined in claim 20, characterized wherein the one-shot provides square wave signals of substantially one-half the cycle time for one complete scan path, said free running oscillator being phase locked to the one-shot signal at approximately a 90 degree phase shift.

22. An optical pattern tracing system of the type having a tracing head with a scanner that projects a photocell in a repeating scan path on the pattern-line and provides signals for each complete path of the scanner across the pattern-line to a control circuit that in response thereto derives control signals for coordinate servo-mechanisms that position the tracing head over the pattern-line, characterized by means for receiving signals from the photocell as it passes over a line and developing line center signals for the control circuit during line tracing, said means for developing line center signals including differentiating means for distinguishing the center of the line to be traced from the edges of the line.

23. An optical pattern tracing system as defined in claim 22, characterized by said means for differentiating including means for differentiating the signals from the photocell to provide a signal having a zero voltage crossing at the peak value of the photocell signals, and a high gain amplifier for the differentiated signals to develop a signal at the zero crossing thereof representing the center of the line traced.

24. An optical pattern tracing system as defined in claim 23, characterized by means for selectively detecting either the right or left edge of a pattern during edge tracing including means disabling the means for differentiating, and a selective inverter that receives signals from the high gain amplifier and provides inverted signals representing either the right or left edge of a pattern.

25. An optical pattern tracing system of the type having a tracing head with a scanner that projects a photocell in a repeating scan path across a line and provides signals for each complete path of the scanner to a control circuit that in response thereto derives control signals for coordinate servo-mechanisms that position the tracing head over the pattern, characterized by line center detection means for receiving signals from the photocell as it passes over the line and providing control signals to the control circuit representing the center of a line to be traced regardless of the width of the line, and said line center detection means including means developing control signals representing the peak value of the signals from the photocell.

26. An optical pattern tracing system as defined in claim 25, characterized by means for nullifying the line center detection means and selectively providing control signals for the control circuit representing the right or left edge of a pattern edge.

27. An optical pattern tracing system of the type having a tracing head with a scanner that projects a photocell in a closed scan path on the pattern and provides first and second signals for each complete path of the scanner across a pattern-line to a control circuit that in response thereto derives control signals for coordinate servo-mechanisms that position the tracing head over the pattern, including means for generating manual control signals for the control circuit to drive the tracing head in approach toward the pattern-line, characterized by means for receiving said photocell signals and blanking alternate ones of said photocell signals so that only one photocell signal per complete path is applied to the control circuit to control steering of the tracing head, means for generating manual control signals and applying them to the means for receiving the photocell signals to drive the tracing head during pattern-line approach, means for selecting either clockwise or counterclockwise direction of travel of the tracing head on the pattern-line after approach and catching the pattern-line including means for selectively blocking either the first or the second signal from the photocell to the control circuit upon initial intersection of the scan path with the pattern-line, means for terminating the manual control signals to the means for receiving the photocell signals upon line catching, means for terminating the means for selectively blocking either the first or the second signal from the photocell a predetermined time after initial intersection of the scan path with the pattern-line, line center detection means for receiving the first and second signals from the photocell and providing control signals to the control circuit representing the center of a line to be traced regardless of the width of the line, said line center detection means including means developing control signals representing the peak value of the signals from the photocell, and means for receiving the signals by the photocell, blanking the one of the signals received and applying the other signal to the control circuit to control steering of the tracing head, said means for receiving the signals from the photocell and blanking the one of the signals received including means for continuing blanking of the one signal from the photocell even though the other signal may not appear from the photocell for one or more complete scan paths.

* * * * *